(12) United States Patent
Redmond

(10) Patent No.: US 10,767,747 B2
(45) Date of Patent: Sep. 8, 2020

(54) LOAD DISTRIBUTION DEVICE

(71) Applicant: Smart Manufacturing Technology Limited, Nottingham (GB)

(72) Inventor: Dennis Redmond, Nottingham (GB)

(73) Assignee: Smart Manufacturing Technology Limited, Nottingham (GB)

( * ) Notice: Subject to any disclaimer, the term of this patent is extended or adjusted under 35 U.S.C. 154(b) by 118 days.

(21) Appl. No.: 15/747,715

(22) PCT Filed: Aug. 19, 2016

(86) PCT No.: PCT/GB2016/052585
§ 371 (c)(1),
(2) Date: Jan. 25, 2018

(87) PCT Pub. No.: WO2017/032990
PCT Pub. Date: Mar. 2, 2017

(65) Prior Publication Data
US 2018/0216718 A1    Aug. 2, 2018

(30) Foreign Application Priority Data
Aug. 25, 2015 (GB) .................................. 1515085.7

(51) Int. Cl.
*F16H 57/00*    (2012.01)
*F16H 37/08*    (2006.01)
*F16H 48/08*    (2006.01)

(52) U.S. Cl.
CPC ..... *F16H 57/0025* (2013.01); *F16H 37/0833* (2013.01); *F16H 48/08* (2013.01)

(58) Field of Classification Search
CPC .. F16H 57/0025; F16H 37/0833; F16H 48/08; F16D 3/20; F16D 3/202;
(Continued)

(56) References Cited

U.S. PATENT DOCUMENTS 2,067,023 A * 1/1937 Schleicher ............. B64D 35/04
74/665 K
2,744,396 A    5/1956 Nagy et al.
(Continued)

FOREIGN PATENT DOCUMENTS

CN    103982633 A    8/2014
DE    2447582 A1    4/1976
(Continued)

*Primary Examiner* — Jake Cook
*Assistant Examiner* — Gregory Robert Weber

(57) ABSTRACT

A device for transmitting a motive force from a prime mover to two transfer shafts includes; an input shaft having a longitudinal axis, a load transfer member which engages the input shaft and rotates around an axis perpendicular to the longitudinal axis of the input shaft and first and second input shaft gears associated with the input shaft. The device further includes a first transfer shaft having a first transfer gear to engage the first input shaft gear and a second transfer shaft having a second transfer gear to engage the second input shaft gear. The first and second input shaft gears engage the load transfer member at different locations thereon, for transmitting the motive force from the input shaft to the first and second transfer shafts.

13 Claims, 9 Drawing Sheets

(58) Field of Classification Search
CPC ..... F16D 2003/2026; F16D 2003/2023; F16D 3/265; F16D 3/38; F16D 3/48
USPC .......... 74/410, 380, 406, 409, 411; 464/102, 464/103, 104, 105
See application file for complete search history.

(56) References Cited

U.S. PATENT DOCUMENTS

| | | | |
|---|---|---|---|
| 4,075,870 A | | 2/1978 | Seifried |
| 4,286,481 A | * | 9/1981 | Miller .................. F16H 1/2854 475/242 |
| 4,856,361 A | | 8/1989 | Shinmoto |
| 5,214,975 A | * | 6/1993 | Zalewski .................. F16D 3/78 464/73 |
| 5,482,602 A | * | 1/1996 | Cooper ............... C23C 14/0605 204/192.11 |
| 6,390,925 B1 | * | 5/2002 | Perrow ................... F16D 1/112 403/316 |
| 7,455,121 B2 | * | 11/2008 | Saito ...................... B25B 21/02 173/162.2 |
| 2011/0105271 A1 | | 5/2011 | Ballester et al. |
| 2016/0138696 A1 | * | 5/2016 | Gielesberger ........... F16H 55/14 74/411 |

FOREIGN PATENT DOCUMENTS

| | | | | |
|---|---|---|---|---|
| DE | 3729818 A1 | | 3/1988 | |
| DE | 3635519 A1 | * | 4/1988 | ......... F16H 37/0833 |
| DE | 19911027 A1 | | 9/2000 | |
| EP | 0172922 A1 | | 3/1986 | |
| EP | 0522792 A1 | | 1/1993 | |
| FR | 434934 A | * | 2/1912 | ............. F16H 3/722 |
| FR | 434934 A | | 2/1912 | |
| WO | 2005026577 A2 | | 3/2005 | |
| WO | 2017032990 A1 | | 3/2017 | |

* cited by examiner

LOAD DISTRIBUTION DEVICE

CROSS-REFERENCE TO RELATED APPLICATION

This application is the National Stage of, and therefore claims the benefit of, International Application No. PCT/GB2016/052585 filed on Aug. 19, 2016, entitled "A LOAD DISTRIBUTION DEVICE," which was published in English under International Publication Number WO 2017/032990 on Mar. 2, 2017, and has a priority date of Aug. 25, 2015, based on GB application 1515085.7. Both of the above applications are commonly assigned with this National Stage application and are incorporated herein by reference in their entirety.

FIELD OF THE DISCLOSURE

The present invention relates to a load distribution device, more specifically, but not exclusively, to a load distribution device for a twin transfer shaft transmission.

BACKGROUND

A transmission is the mechanism by which a driving force or toque is transmitted from a driving element (e.g. an engine, motor, wheel, wind turbine etc.) to a driven element (e.g. an axle, wheel generator etc.); in a conventional automotive setting it is from an engine to an axle. An automotive transmission typically includes a gearbox with multiple sets of gears having different transmission ratios, and can be used to switch between these sets of gears as requirements vary.

Conventional gearboxes comprise a single transfer shaft, typically known as a layshaft. However, with the current drive towards higher numbers of gears to increase overall efficiency, a second layshaft is typically provided. This second layshaft enables the transmission to remain compact, e.g. as it allows for two 'shorter' layshafts to be provided side-by-side, rather than one 'longer' layshaft. In such a twin layshaft transmission, the torque transmitted to the two layshafts needs to be equal, in order to maximise performance, minimise wear and increase durability. However, due to normal manufacturing tolerances of transmission components, equal distribution of the transmitted torque is often not economically achievable in high volume production without additional compensating elements.

The present disclosure seeks to overcome or at least mitigate the problems associated with the prior art.

SUMMARY

A first aspect of the disclosure provides a device for transmitting a motive force from a prime mover to two transfer shafts, comprising: an input shaft having a longitudinal axis; a load transfer member, wherein the load transfer member engages the input shaft and rotates around an axis perpendicular to the longitudinal axis of the input shaft; a first input shaft gear associated with the input shaft and a second input shaft gear associated with the input shaft; a first transfer shaft having a first transfer gear configured to engage the first input shaft gear and a second transfer shaft having a second transfer gear configured to engage the second input shaft gear, wherein the first and second input shaft gears engage the load transfer member at different locations thereon for transmitting the motive force from the input shaft to the first and second transfer shafts.

Advantageously, arranging the first input shaft gear and the second input shaft gear so as to engage the input shaft via different locations on a rotatable load transfer member provides an even distribution of the transmitted motive force between the first and second transfer shafts.

The load transfer member preferably comprises a first loading region to engage the first input shaft gear and a second loading region to engage the second input shaft gear, and wherein the load transfer member defines a central point and the first and second loading regions are equally spaced from said central point.

Advantageously, arranging the two contact points at equal spaces from the centre of the rotatable load transfer member provides a more even distribution of the motive force between the first and second transfer shifts.

Preferably, the first and second loading regions are in sliding contact with the first and second input gears, respectively.

Advantageously, this arrangement enables the contacts points between the first and second loading regions and the first and second input gears to slide due to small variations in the rotations of the first and second input shaft gears with respect to each other. This arrangement advantageously further provides a more even distribution of the motive force between the first and second transfer shafts.

Preferably, the first loading region and second loading region are rounded.

Advantageously, this arrangement provide a smooth contact point between the load transfer member and the first and second input shaft gears to reduce contact stresses.

Each of the first input shaft gear and second input shaft gear preferably comprise a circumferential slot configured to engage the first and second loading regions respectively.

Advantageously, this arrangement provides an easy way of mounting the first and second input shaft gears to the load transfer members.

Preferably, the circumferential slot of the first input shaft gear is configured to receive the first loading region and the circumferential slot of the second input shaft gear is configured to receive the second loading region.

More preferably the circumferential slot defines opposing lateral walls, and a contact pad configured to conform to the shape of the lateral walls and the first and second loading regions is provided at each of the opposing lateral sides.

Advantageously, as the contact pads are configured to conform to the shape of the lateral walls they are able to easily be fitted and provide a large contact area. The pads are also configured to conform to the shape of the loading regions, which again provides a larger contact surface area, reducing wear and thus increasing the lifespan of the transfer member and thus the transmission.

In one embodiment the contact pads are a separate component from the load transfer member and the input shaft gears.

Advantageously, this arrangement enables the pads to slide along the lateral sides of the circumferential slots to compensate for relative movement between the first and second input shaft gears, reducing wear and thus extending the lifespan of the transmission.

The input shaft preferably comprises a radial protrusion proximate a first longitudinal end of the input shaft.

Advantageously, this arrangement provides a simple method of rotationally securing the load transfer member to the input shaft.

Preferably the radial protrusion defines a perimeter, further wherein the load transfer member comprises a central aperture which substantially conforms to the perimeter of the radial protrusion.

Advantageously, this provides an easy method of fitting the load transfer member to the radial protrusion.

More preferably the radial protrusion is substantially cylindrical.

The load transfer member is preferably rotationally mounted on the radial protrusion.

Advantageously, this arrangement enables the load transfer member to be rotationally secured to the radial protrusion without the need of bearings or other fastening means.

Preferably the load transfer member is substantially a rounded cross shape in front view.

BRIEF DESCRIPTION OF THE DRAWINGS

Embodiments of the disclosure will now be described with reference to the accompanying drawings, in which.

DETAILED DESCRIPTION OF EMBODIMENT(S)

Figure 1A:
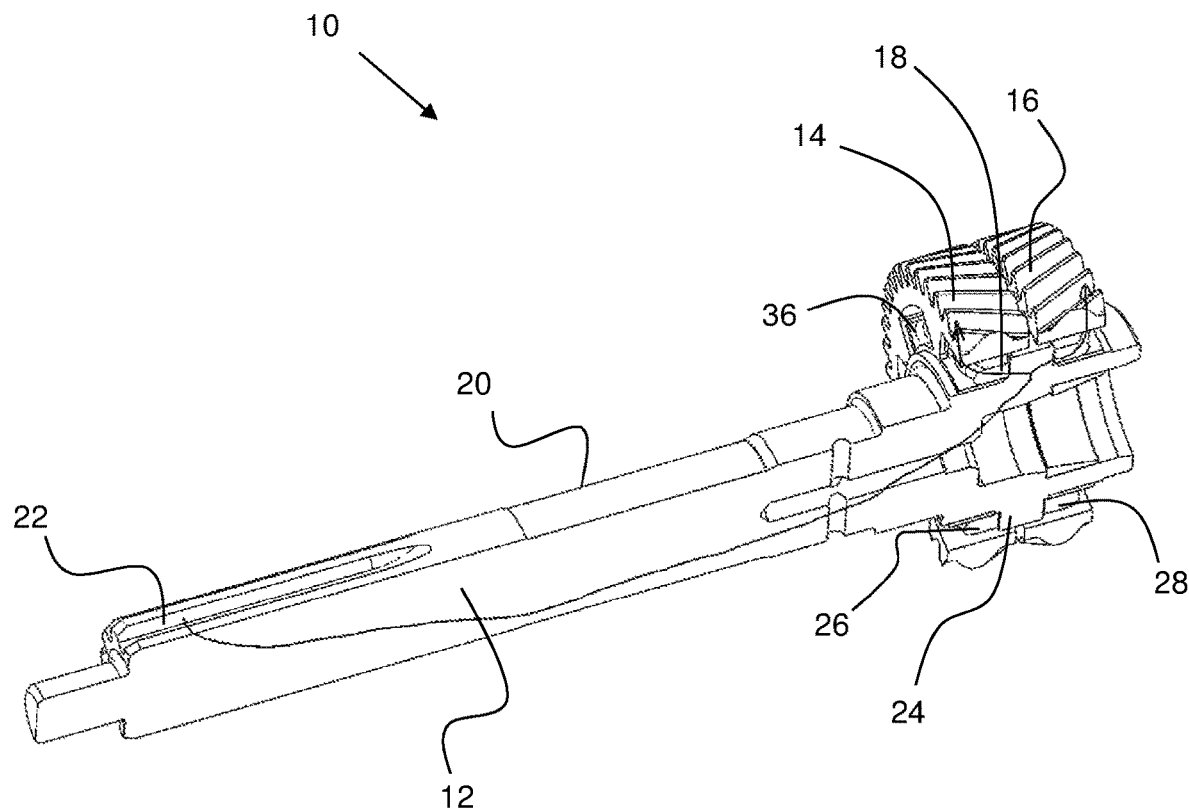
FIG. 1A is an isometric cross-section view of a device according to the present disclosure.
Figure 1B:
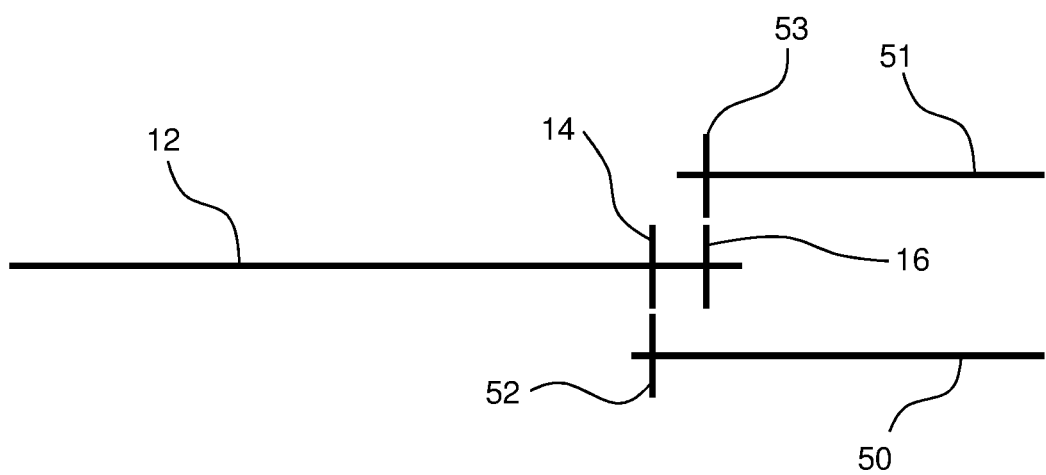
FIG. 1B is a schematic of a device according to the present disclosure.
Figure 2:
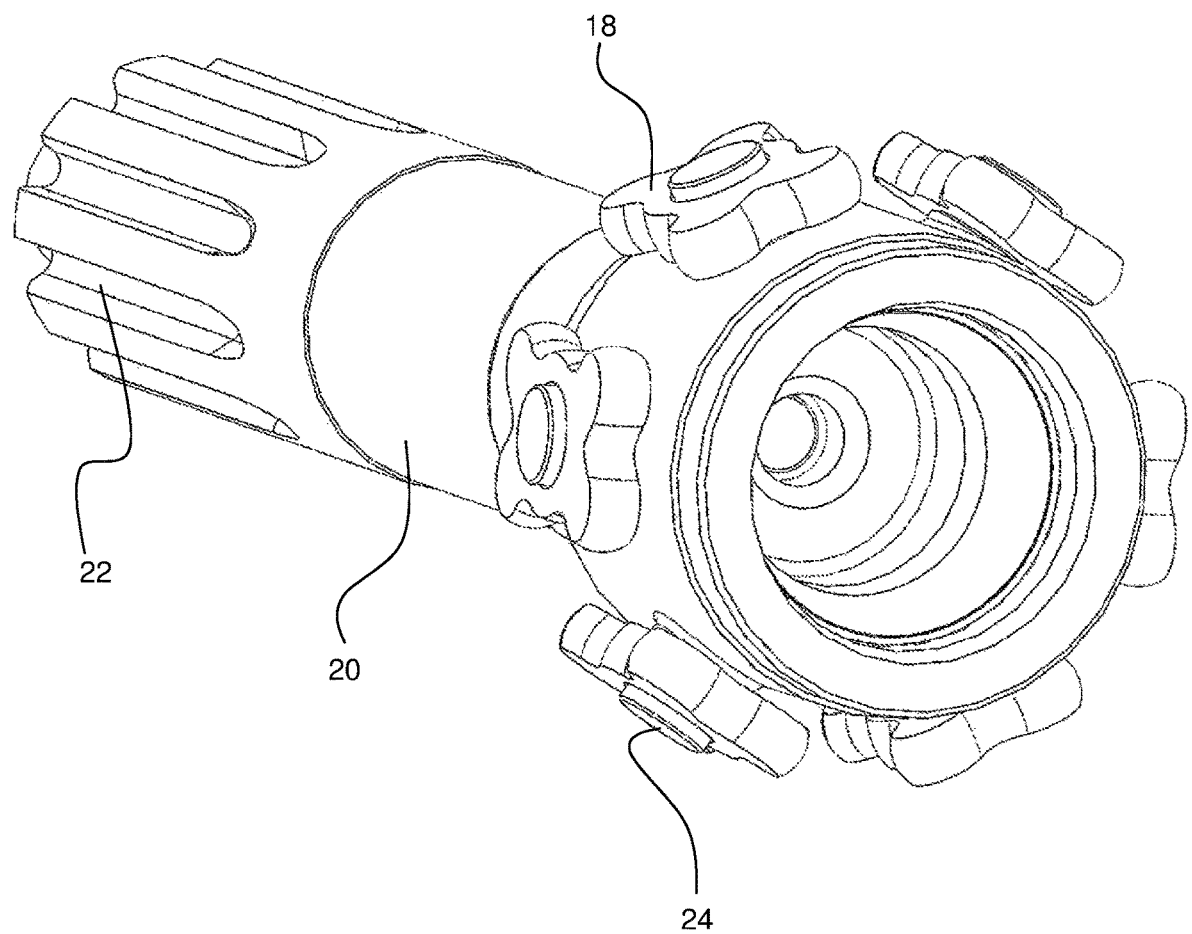
FIG. 2 is an isometric view of an input shaft of the device of FIG. 1A having load transfer members placed thereon.
Figure 3:
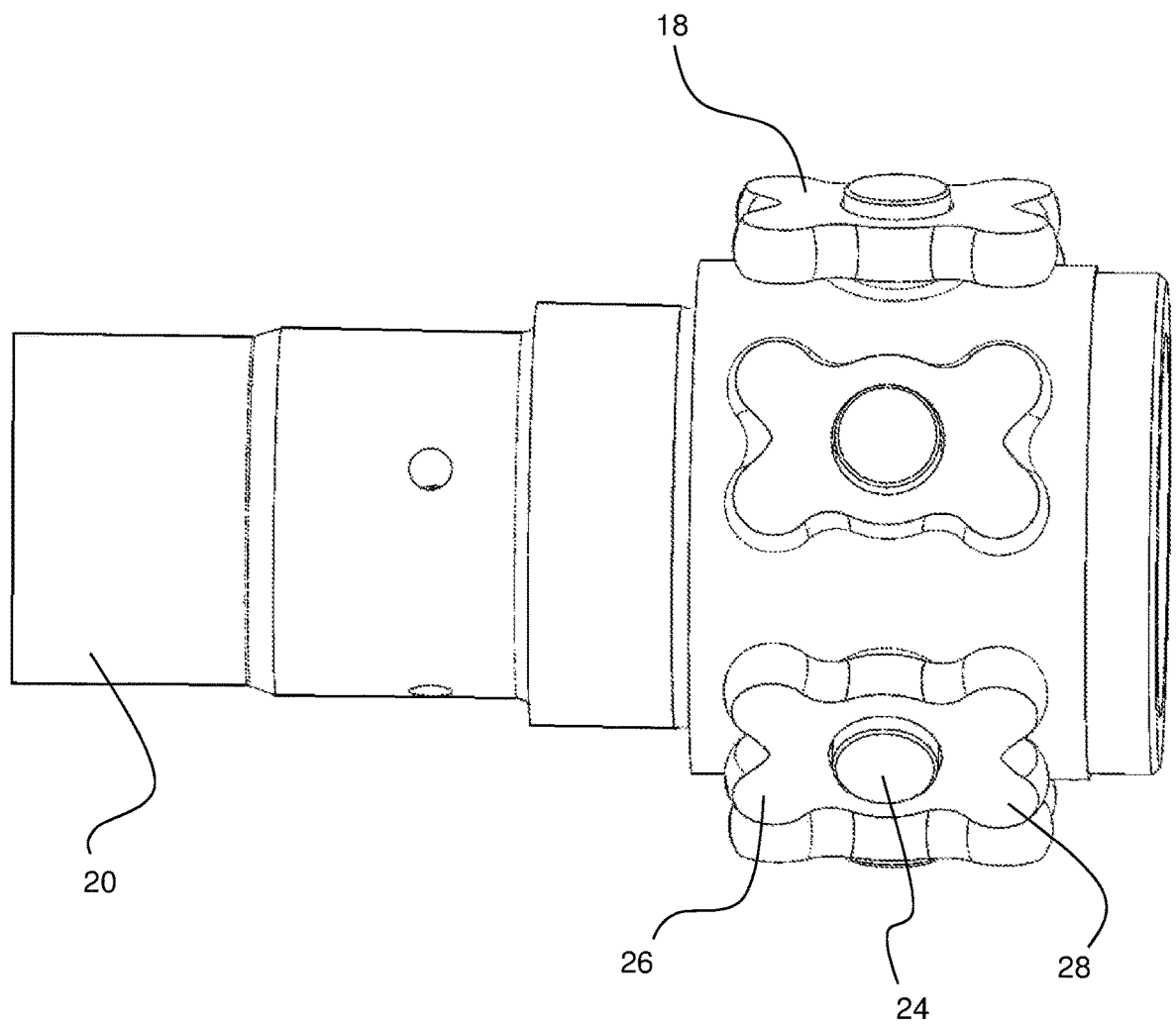
FIG. 3 is a side view of the input shaft of FIG. 2.
Figure 4:
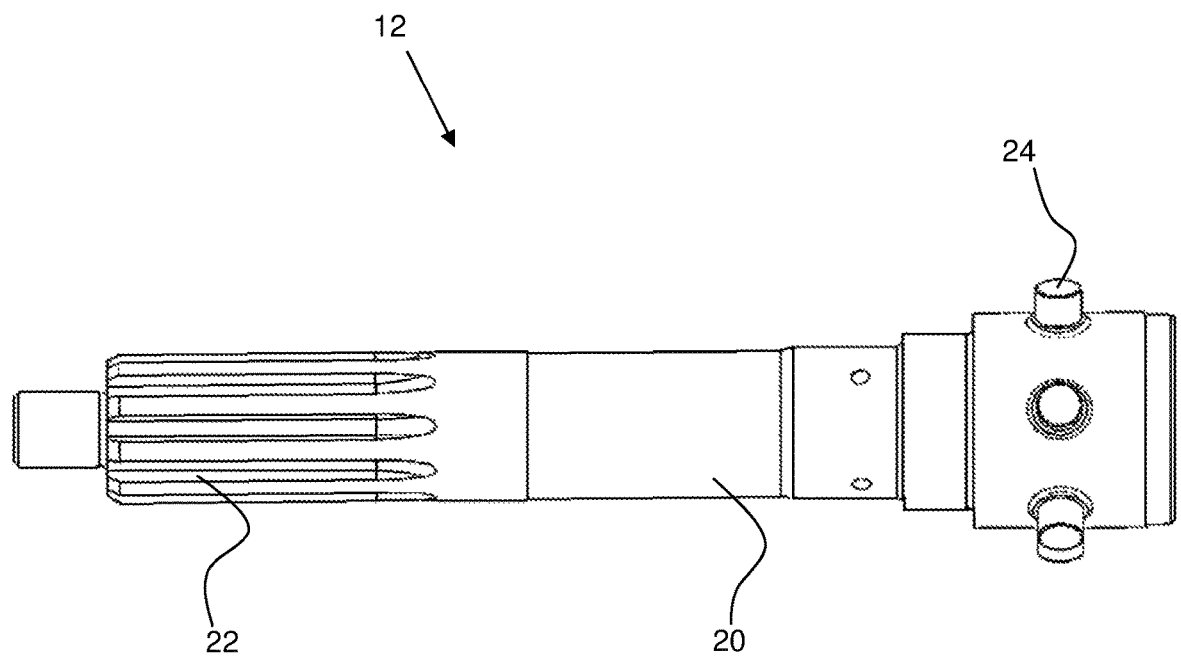
FIG. 4 is an isometric view of an input shaft of the device of FIG. 1A.
Figure 5:
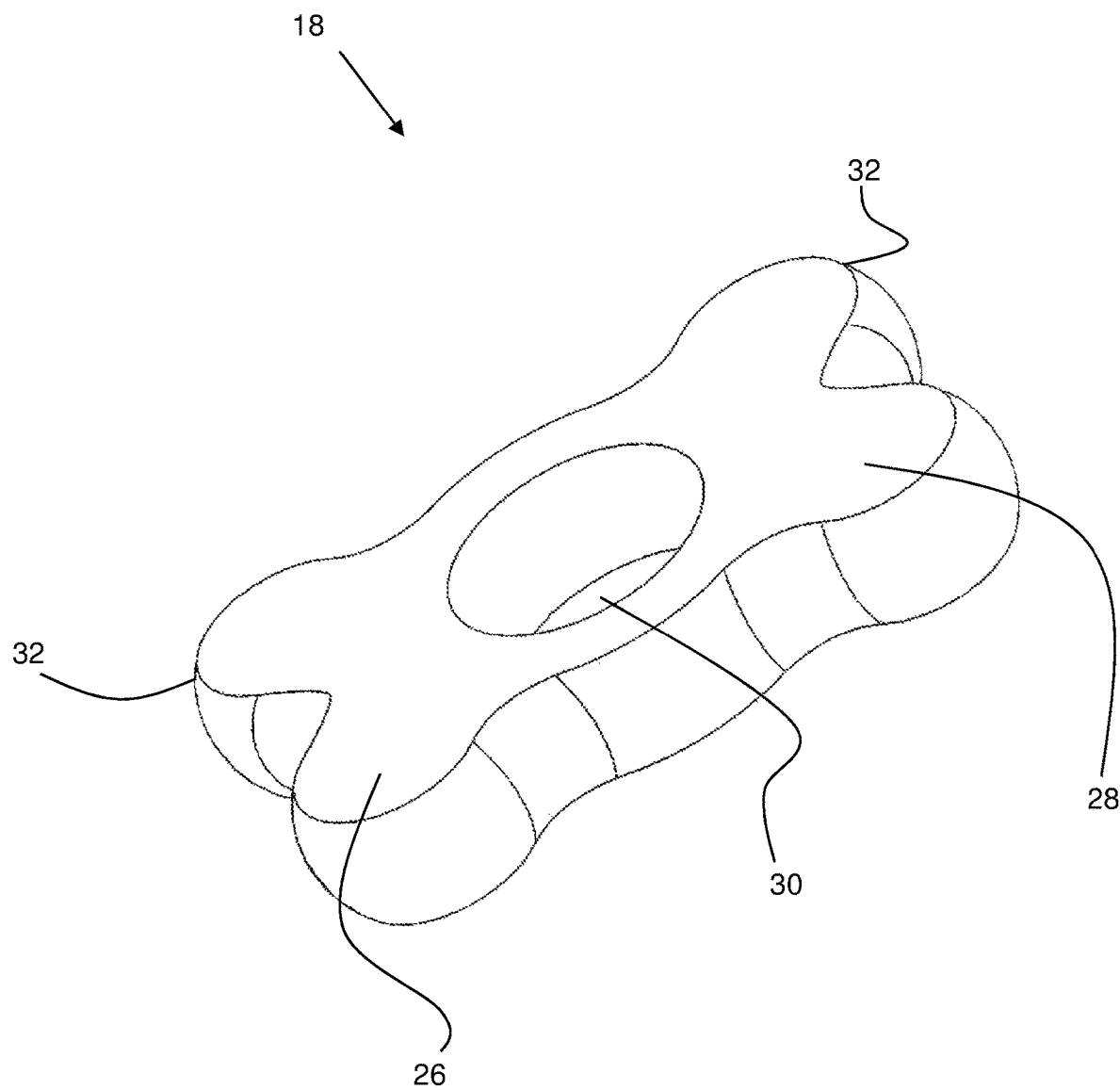
FIG. 5 is an isometric view of a load transfer member of the device of FIG. 1A.

Referring firstly to FIGS. 1A and 1B (collectively referred to herein as "FIG. 1"), a device in the form of a transmission for transmitting a motive force from a prime mover to two transfer shafts 50, 51 is indicated generally at 10. FIG. 1A illustrates an isometric cross-section view of the device 10 according to the present disclosure, whereas FIG. 1B illustrates a less detailed schematic of the device 10 according to the present disclosure. The transmission 10 includes an input shaft 12, first and second input gears 14, 16, a plurality of load transfer members 18 and a plurality of contact pads 36. In the illustrated embodiment, six load transfer members and twelve contact pads associated with the six load transfer members are used, but it will be appreciated that any suitable number of load transfer members may be used.

The input shaft 12 defines a shaft body 20 which extends along a longitudinal axis. The input shaft 12 is provided with a plurality of splines 22 proximate a first longitudinal end, also known as an input end, of the shaft body 20. The input shaft 12 is further provided with a plurality of mounts 24 positioned circumferentially around the shaft body 20 proximate a second longitudinal end, also known as an output end, of the shaft body 20. The splines 22 are configured to engage a component of a prime mover (not shown), so as to transmit a motive force, i.e. a torque, generated by the prime mover from the splines 22 along the shaft body 20 towards the mounts 24.

The transmission 10 further includes a first input shaft gear 14 provided around the input shaft 12 and a second input shaft gear 16 provided around the input shaft 12. The load transfer members 18 engage the input shaft 12 via the plurality of mounts 24. The load transfer members 18 are positioned on or mounted to the input shaft 12 so as to be rotatable around an axis perpendicular to the longitudinal axis of the input shaft, where the axis of rotation is the centre point of the mount 24.

The load transfer member 18 includes a first longitudinal end 26 and a second longitudinal end 28, which are positioned at opposing side of the mount 24 when positioned thereon. The first and second input shaft gears 14, 16 are configured to engage the plurality of load transfer members 18, so that the torque from the prime mover can be transmitted thereto. In the illustrated embodiment, the first and second input shaft gears 14, 16 engage the plurality of load transfer members 18 via two contact pads 36. However it will be appreciated that the contact pads 36 may not be provided and the load transfer members 18 may directly engage the first and second input shaft gears 14, 16. The first input shaft gear 14 engages the load transfer member 18 at the first end 26 of the load transfer member 18 and the second input shaft gear 16 engages the load transfer member 18 at the second end 28 of the load transfer member 18. In use, the first input gear 14 is arranged to engage a first transfer shaft 50, also known as a first layshaft, via a first transfer gear 52. The second input gear 16 is arranged to engage a second transfer shaft 51 via a second transfer gear 53.

Mounting the first and second input shaft gears 14, 16 to the input shaft 12 indirectly via the load transfer members 18 enables the torque that is transmitted from the prime mover to the input shaft gears 14, 16 to be distributed therebetween, so as to transfer the torque from a single input shaft to two transfer shafts 50, 51. Manufacturing imperfections result in angular misalignment between the first and second transfer gears 52, 53 on the first and second transfer shafts 50, 51. If the input shaft gears 14, 16 were rigidly mounted on the input shaft 12, significantly unequal torque would be transmitted to the first and second transfer shafts 50, 51. Enabling the load transfer members 18 to freely pivot or rotate around the radial protrusions 24, allows the load transfer members 18 to engage with either the first input shaft gear 14 at a longitudinal end 26 or a second input shaft gear 16 at a longitudinal end 28 of the load transfer member 18. As torque is applied to the input shaft 12, the load transfer members 18 engage either the first or second input shaft gear 14, 16 and pivot about the radial protrusion 24 until it engages the other of the first or second input shaft gears 14, 16. This results in equal torque being transmitted to the first and second transfer shafts 50, 51, thus compensating for any manufacturing imperfections.

The first and second gears 14, 16 are fixed on the input shaft 12 only in an axial direction and configured to be able to rotate freely. In the illustrated embodiment, the load transfer member 18 is a separate component to the shaft 12 and is placed over the mount 24 but is not secured thereto. In alternative embodiments, bearings of different types may be fitted between the load transfer member 18 and the input shaft 12, to reduce wear and noise.

Referring to FIGS. 2 to 5, the input shaft 12 and load transfer member 18 of FIG. 1A are illustrated in more detail. The input shaft 12 further includes mount 24, in the form of a radial protrusion 24, proximate a first longitudinal end of the input shaft 12. In the illustrated embodiment, the radial protrusion 24 is substantially cylindrical and extends radially away from the outer surface of the input shaft 12. Providing a radial protrusion 24 that is circular in cross section enables the load transfer member 18 to be rotationally secured to the input shaft 12. In alternative embodiments, the radial protrusion is a separate component which is then secured to the input shaft 12 e.g. via a fastener.

The radial protrusion 24 defines an outer perimeter that is substantially circular and the load transfer member 18 is provided with a central aperture 30 configured to conform to the perimeter of the radial protrusion 24. This enables the load transfer member 18 to be rotationally secured to the radial protrusion 24 (but not secured thereto) so as to be able to rotate around an axis that is perpendicular to the surface of the input shaft 12. Additionally, this arrangement enables the load transfer member to be rotationally secured to the radial protrusion without the need of bearings or other fastening means. However, it will be appreciated that in alternative embodiments the load transfer member 18 may be rotationally secured to the input shaft 12 via any suitable means.

The load transfer member 18 is substantially a rounded cross shape in front view. The load transfer member 18 includes a first loading region 26 arranged to engage the first input shaft gear 14 and a second loading region 28 arranged to engage the second input shaft gear 16. The first loading region 26 and the second loading region 28 are equally spaced from the central aperture 30. This provides an even distribution of the motive force between the first and second transfer shifts from the prime mover.

In the illustrated embodiment, the first loading region 26 and second loading region 28 are each formed from a pair of rounded corners, or lobes 32. These rounded corners 32 are configured to provide a smooth contact point between the load transfer member 18 and the first and second input shaft gears 14, 16, which enables the loading regions 26, 28 to slide more evenly over the first and second input gears, respectively. However, in alternative embodiments, the corners may be flat or any other suitable shape.

Figure 6:
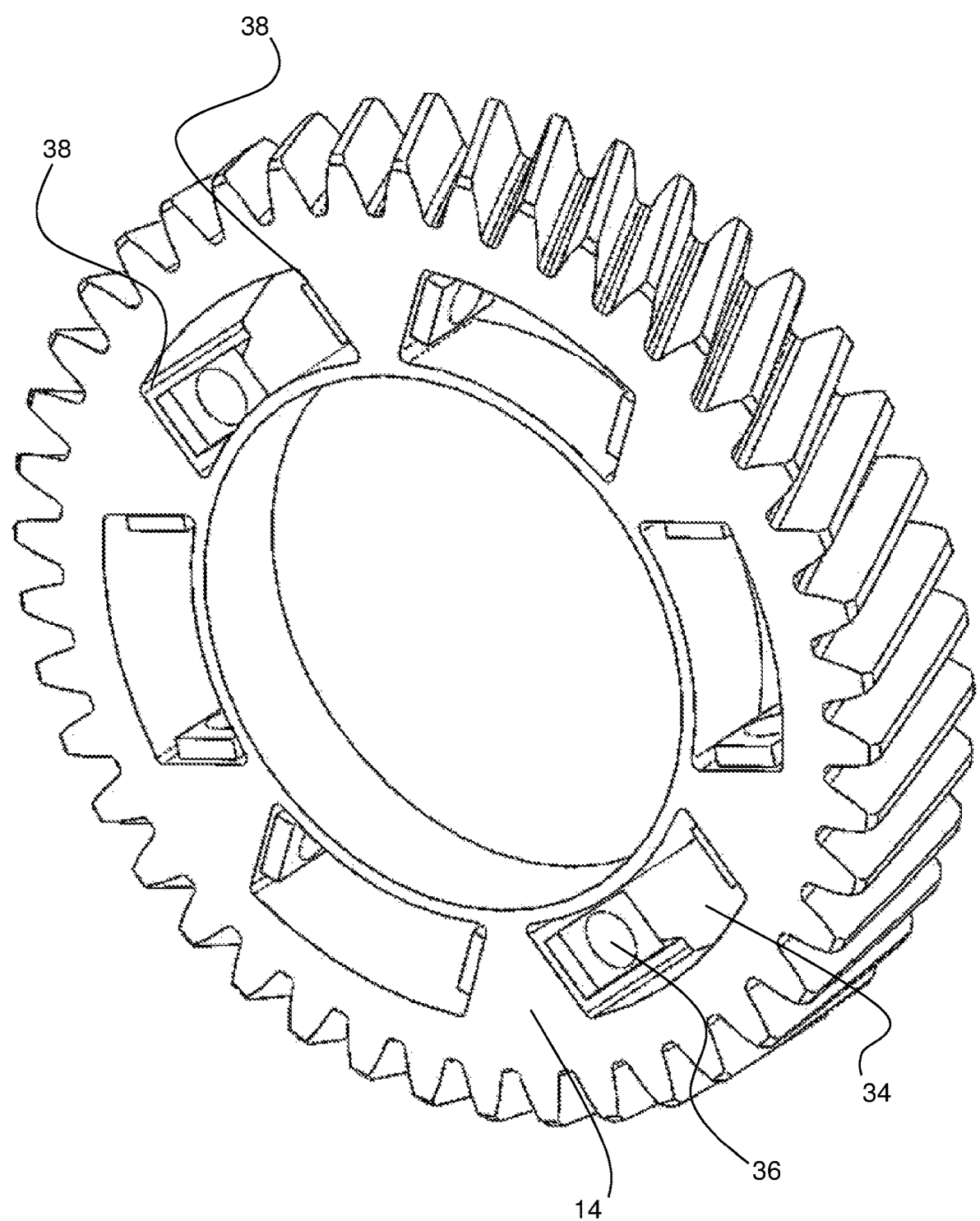
FIG. 6 is an isometric view of an input shaft gear and contact pad of the device of FIG. 1A.
Figure 7:
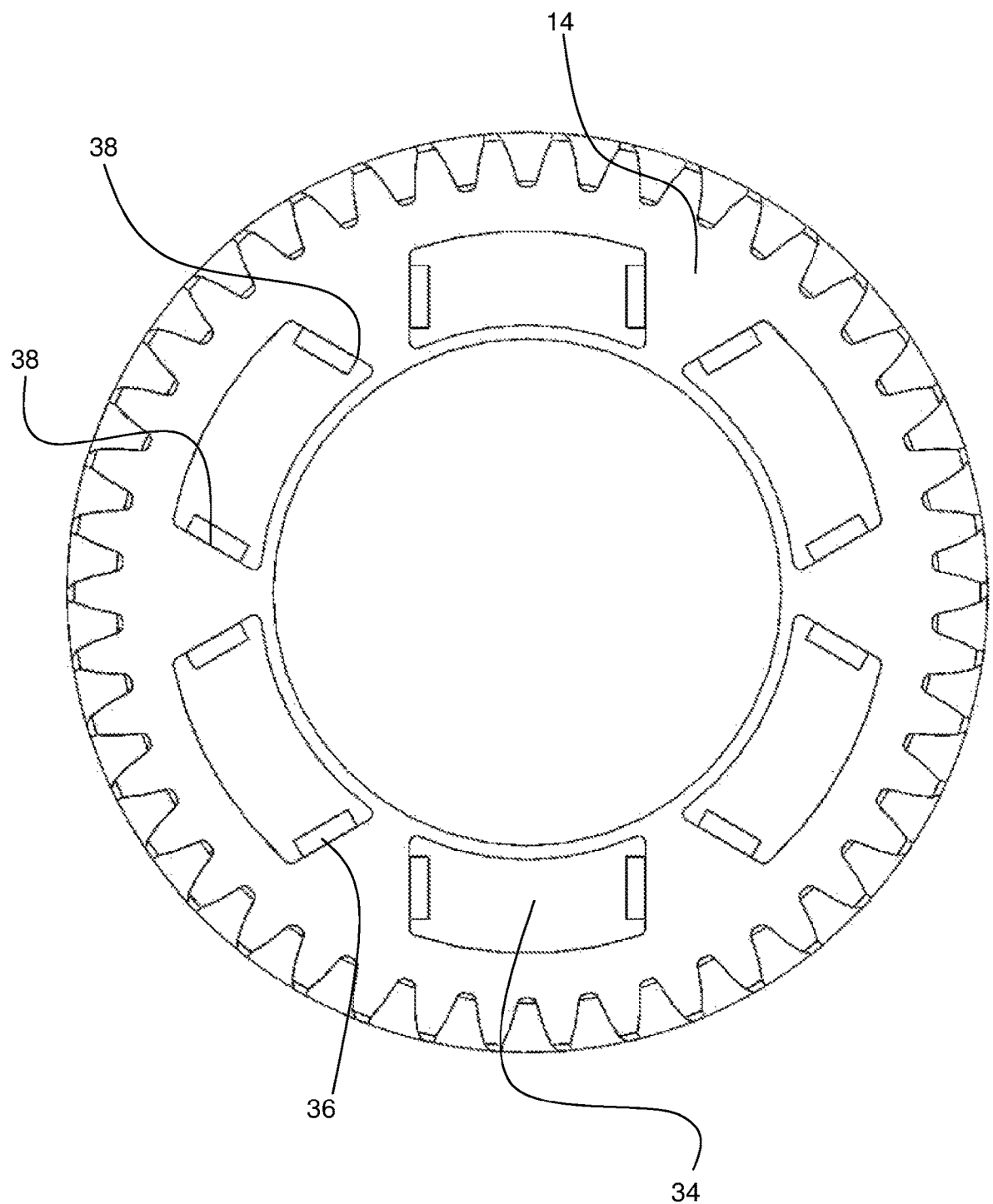
FIG. 7 is a front view of the input shaft gear of FIG. 6.
Figure 8:
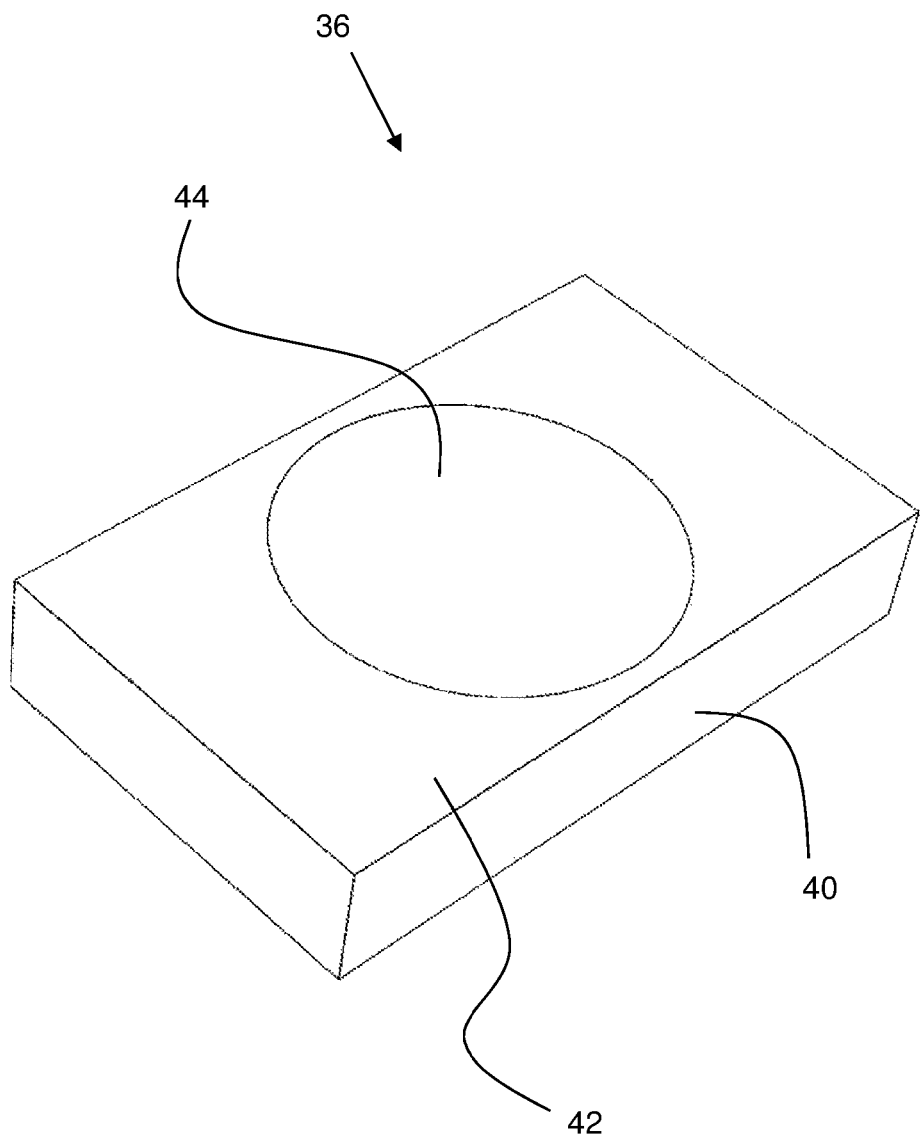
FIG. 8 is an isometric view of a contact pad of the device of FIG. 1A.

Referring to FIGS. 6 to 8, the input gear shaft 14 is illustrated in more detail. The following description is based upon the first input shaft gear 14. In the illustrated embodiment, the first input shaft gear 14 is the mirror of the second input shaft gear 16, and so it will be appreciated that the descriptions with respect to first input gear shaft 14 also correspond to the features of the second input gear shaft 16.

In the illustrated embodiment, the teeth of the gears 14, 16 are helical and so the helix of the first input shaft gear 14 and the second input shaft gear 16 are opposite, i.e. one left hand and the other right hand (as is illustrated in FIG. 1A). This arrangement improves the balancing of the transmitted torque between the two transfer shafts 50, 51. However, in alternative embodiments, the gears 14, 16 may be identical, or any other suitable arrangement of the first and second input shaft gears 14, 16 may be used.

The first input shaft gear 14 is provided with a series of slots 34, which are arranged circumferentially around the first input shaft gear 14, which are configured to receive the first loading region 26 of the load transfer member 18. The slots 34 define a circle coaxial with the rotational axis of the first input shaft gear 14. The number of circumferential slots 34 is arranged to match the number of radial protrusions 24 and hence the number of load transfer members 18 that are being used in the system. Accordingly, although six circumferential slots 34 are shown in the illustrated embodiment, it will be understood that any suitable number of circumferential slots 34, and hence load transfer members 18 may be used.

Each circumferential slot 34 of the first input shaft gear 14 and second input shaft gear 16 is configured to receive the first loading region 26 or the second loading region 28, respectively, of a load transfer member 18, so as to transmit the motive force from the prime mover.

A contact pad 36, as illustrated in more detail in FIG. 8, is provided at each opposing lateral wall 38 of each of the circumferential slots 34. The contact pad 36 is provided with a substantially planar surface 40 configured to conform to the surface of the lateral walls 38 of the circumferential slot 34, so as to be able to slide therealong.

The contact pad 36 is further provided with a second surface 42 on an opposing side of the contact pad 36 to the planar surface 40. This second surface 42 is provided with a recessed region 44, which is configured to conform to the rounded corners 32 of the first and second loading region 26, 28.

This arrangement enables the contact pads 36 to conform to the shape of the lateral walls 38 and to be easily fitted and provide a large contact area. The pads 36 are also configured to conform to the shape of the loading regions 32, which again provides a larger contact surface area. Increasing the contact are between the contact pad 36 and the input shaft gear 14, and also between the contact pad 36 and the load transfer member 18, reduces wear of the components and increases the lifespan of the load transfer member 18 and the transmission as a whole.

In the illustrated embodiment, each contact pad 36 is a separate component from the load transfer member 18 and the input shaft gears 14, 16. This enables the contact pads 36 to slide along the lateral sides 38 of the circumferential slots 34, to compensate for relative movement between the first and second input shaft gears 14, 16. This results in that the first and second loading regions 26, 28 are in sliding contact with the first and second input gears 14, 16 respectively via the contact pads 36. This enables the contacts points between the first and second loading regions 26, 28 and the first and second input shaft gears 14, 16 to slide, due to small variations in the rotations of the first and second input shaft gears with respect to each other, resulting in a more even distribution of the motive force between the first and second transfer shafts 50, 51.

Due to manufacturing tolerances, the angular positional deflections of the first and second input shaft gears 14, 16 may be different between the first or second input shaft gears 14, 16 and the gears of the first or second transfer shafts, respectively. Even very small differences in such deflections can cause significantly uneven distribution of the transmitted load. This can cause overloading of the components of one shaft, resulting in increased wear, shorter service life of one shaft and may possibly result in increased noise of the transmission. The small relative movements of the gears can compensate for the differences in the misalignments due to the manufacturing tolerances while maintaining the load equally distributed on the first and second input shaft gears 14, 16 and consequently transmitting equal loads to the two transfer shafts 50, 51.

Although the disclosure has been described above with reference to one or more preferred embodiments, it will be appreciated that various changes or modifications may be made without departing from the scope of the disclosure as defined in the appended claims.

The invention claimed is:

1. A device for transmitting a motive force from a prime mover to first and second transfer shafts, comprising:
   an input shaft having a longitudinal axis;

a load transfer member, wherein the load transfer member engages the input shaft and rotates around an axis perpendicular to the longitudinal axis of the input shaft;

a first input shaft gear associated with the input shaft and a second input shaft gear associated with the input shaft;

a first transfer shaft having a first transfer gear configured to engage the first input shaft gear and a second transfer shaft having a second transfer gear configured to engage the second input shaft gear;

wherein the first and second input shaft gears engage the load transfer member at different locations thereon for transmitting the motive force from the input shaft to the first and second transfer shafts, and such that the load transfer member is able to rotate less than 360 degrees; and wherein the first and second input shaft gears are mounted to the input shaft indirectly via the load transfer member.

2. A device according to claim 1, wherein the load transfer member comprises a first loading region to engage the first input shaft gear and a second loading region to engage the second input shaft gear, and wherein the load transfer member defines a central point and the first and second loading regions are equally spaced from said central point.

3. A device according to claim 2, wherein the first and second loading regions are in sliding contact with the first and second input gears, respectively.

4. A device according to claim 3, wherein the first loading region and the second loading region are rounded.

5. A device according to claim 2, wherein each of the first input shaft gear and second input shaft gear comprise a slot arranged circumferentially around said input shaft gear, and configured to engage the first and second loading regions respectively.

6. A device according to claim 5, wherein the circumferential slot of the first input shaft gear is configured to receive the first loading region and the circumferential slot of the second input shaft gear is configured to receive the second loading region.

7. A device according to claim 5, wherein the circumferential slot defines opposing lateral walls, and a contact pad configured to conform to the shape of the lateral walls and the first and second loading regions is provided at each of the opposing lateral walls.

8. A device according to claim 7, wherein the contact pads are a separate component from the load transfer member and the input shaft gears.

9. A device according to claim 1, wherein the input shaft further comprises a radial protrusion at a first longitudinal end of the input shaft.

10. A device according to claim 9, wherein the radial protrusion defines a perimeter, further wherein the load transfer member comprises a central aperture which conforms to the perimeter of the radial protrusion.

11. A device according to claim 9, wherein the radial protrusion is cylindrical.

12. A device according to claim 9, wherein the load transfer member is rotationally mounted on the radial protrusion.

13. A device according to claim 1, wherein the load transfer member is a rounded cross shape in plan view.

* * * * *